United States Patent
Harata et al.

(10) Patent No.: US 11,721,805 B2
(45) Date of Patent: *Aug. 8, 2023

(54) NEGATIVE ELECTRODE ACTIVE MATERIAL CONTAINING SILICON CLATHRATE II

(71) Applicants: KABUSHIKI KAISHA TOYOTA JIDOSHOKKI, Kariya (JP); TOYOTA JIDOSHA KABUSHIKI KAISHA, Toyota (JP)

(72) Inventors: Masanori Harata, Kariya (JP); Tatsuya Eguchi, Kariya (JP); Masakazu Murase, Kariya (JP); Jun Yoshida, Mishima (JP); Kazuhiro Suzuki, Hadano (JP); Daichi Kosaka, Toyota (JP); Shinji Nakanishi, Shizuoka-ken (JP)

(73) Assignees: KABUSHIKI KAISHA TOYOTA JIDOSHOKKI, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 275 days.

This patent is subject to a terminal disclaimer.

(21) Appl. No.: 17/002,304

(22) Filed: Aug. 25, 2020

(65) Prior Publication Data
US 2021/0066713 A1 Mar. 4, 2021

(30) Foreign Application Priority Data
Aug. 27, 2019 (JP) .............................. JP2019-154879

(51) Int. Cl.
*H01M 4/00* (2006.01)
*H01B 1/04* (2006.01)
(Continued)

(52) U.S. Cl.
CPC ............. *H01M 4/386* (2013.01); *C01B 33/02* (2013.01); *C22C 24/00* (2013.01); *H01B 1/04* (2013.01);
(Continued)

(58) Field of Classification Search
CPC .......... H01B 1/04; H01M 4/386; C01B 33/00; C01B 33/02
See application file for complete search history.

(56) References Cited

U.S. PATENT DOCUMENTS

2012/0021283 A1  1/2012  Chan et al.
2015/0376016 A1* 12/2015  Krishna ................ C01B 33/037
                                               252/62.3 T
(Continued)

FOREIGN PATENT DOCUMENTS

JP     2012-224488 A    11/2012
JP     2017-59534 A      3/2017
(Continued)

OTHER PUBLICATIONS

Anno et al. "Mechanical Properties of Thermoelectric Ba8Al15Si31 Clathrate Prepared by Combining Arc Melting and Spark Plasma Sintering Techniques", Journal of Electronic Materials, vol. 45, No. 3, 2015, pp. 1803-1811.*

(Continued)

*Primary Examiner* — Mark Kopec
(74) *Attorney, Agent, or Firm* — Sughrue Mion, PLLC

(57) ABSTRACT

Provided is a negative electrode active material that contains silicon clathrate II and that is suitable for a negative electrode of a lithium ion secondary battery. The negative electrode active material includes a silicon material in which silicon clathrate II represented by composition formula
(Continued)

$Na_xSi_{136}$ (0≤x≤10) is contained and a volume of a pore having a diameter of not greater than 100 nm is not less than 0.025 cm$^3$/g.

3 Claims, 2 Drawing Sheets

(51) Int. Cl.
  *C01B 33/02* (2006.01)
  *H01M 4/38* (2006.01)
  *H01M 10/0525* (2010.01)
  *C22C 24/00* (2006.01)
  *H01M 4/02* (2006.01)

(52) U.S. Cl.
  CPC ....... *H01M 4/381* (2013.01); *H01M 10/0525* (2013.01); *C01P 2002/54* (2013.01); *C01P 2002/72* (2013.01); *C01P 2006/14* (2013.01); *C01P 2006/16* (2013.01); *C01P 2006/40* (2013.01); *H01M 2004/027* (2013.01)

(56) References Cited

U.S. PATENT DOCUMENTS

| | | | |
|---|---|---|---|
| 2018/0323631 | A1 | 11/2018 | Otaki et al. |
| 2020/0020929 | A1 | 1/2020 | Yoshida et al. |
| 2020/0020936 | A1* | 1/2020 | Yoshida ............... H01M 4/386 |
| 2020/0176768 | A1 | 6/2020 | Kosaka et al. |
| 2021/0305556 | A1* | 9/2021 | Otaki ................... H01M 4/386 |
| 2021/0391576 | A1* | 12/2021 | Otaki ................... H01M 4/0495 |

FOREIGN PATENT DOCUMENTS

| | | |
|---|---|---|
| JP | 2020-17513 A | 1/2020 |
| JP | 2020-87886 A | 6/2020 |
| WO | 00/17104 A1 | 3/2000 |
| WO | WO 01/17104 * | 3/2000 |

OTHER PUBLICATIONS

Hiro-Omi Horie et al. "Controlled thermal decomposition of NaSi to derive silicon clathrate compounds", Journal of Solid State Chemistry, Jan. 2009, pp. 129-135, vol. 182, Issue 1.

Karttunen et al., "Structural principles of semiconducting group 14 clathrate frameworks", Inorg. Chem., vol. 50, pp. 1733-1742, 2011 (10 pages total).

Ramachandran et al., "Synthesis and x-ray characterization of silicon clathrates", Journal of Solid State Chemistry, vol. 145, pp. 716-730, 1999 (15 pages total).

Office Action dated Dec. 6, 2022 issued in related U.S. Appl. No. 17/210,824.

* cited by examiner

NEGATIVE ELECTRODE ACTIVE MATERIAL CONTAINING SILICON CLATHRATE II

PARTIES TO A JOINT RESEARCH AGREEMENT

The subject matter of the present application was developed and made as a result of a joint research agreement within the meaning of 35 U.S.C. §§ 100(h) and 102(c) and 37 C.F.R. § 1.9(e) between KABUSHIKI KAISHA TOYOTA JIDOSHOKKI and TOYOTA JIDOSHA KABUSHIKI KAISHA. The joint research agreement was in effect on or before the effective filing date of the claimed invention, and the claimed invention was made as a result of activities undertaken within the scope of the joint research agreement.

TECHNICAL FIELD

The present invention relates to a negative electrode active material containing silicon clathrate II.

BACKGROUND ART

A compound called a silicon clathrate that contains another metal in a space in a polyhedron formed by Si, is known. Among the silicon clathrates, researches on silicon clathrates I and silicon clathrates II are mainly reported.

The silicon clathrate I is represented by composition formula $Na_8Si_{46}$ in which a dodecahedron having 20 Si atoms and one Na atom enclosed by the 20 Si atoms and a tetradecahedron having 24 Si atoms and one Na atom enclosed by the 24 Si atoms have faces that are common to both. All of the polyhedral cages of the silicon clathrate I contain Na.

The silicon clathrate II is represented by composition formula $Na_xSi_{136}$ in which a dodecahedron formed by Si and a hexadecahedron formed by Si have faces that are common to both. x satisfies $0 \leq x \leq 24$. That is, the polyhedral cage of the silicon clathrate II contains Na or does not contain Na.

H. Horie, T. Kikudome, K. Teramura, and S. Yamanaka, Journal of Solid State Chemistry, 182, 2009, pp. 129-135 (Non-Patent Literature 1) describes a method for producing the silicon clathrate I and the silicon clathrate II from an Na—Si alloy that contains Na and Si. Specifically, according to Non-Patent Literature 1, under a reduced-pressure condition in which the pressure was less than $10^{-4}$ Torr (that is, less than $1.3 \times 10^{-2}$ Pa), the Na—Si alloy was heated to a temperature of 400° C. or higher to remove Na as vapor, thereby producing the silicon clathrate I and the silicon clathrate II. Furthermore, Non-Patent Literature 1 indicates that a production ratio between the silicon clathrate I and the silicon clathrate II varies due to difference in heating temperature, and indicates that a high heating temperature causes separation of Na from the silicon clathrate I to change the structure of the silicon clathrate I, so that a typical Si crystal having a diamond structure is formed.

Furthermore, Non-Patent Literature 1 indicates that $Na_{22.56}Si_{136}$, $Na_{17.12}Si_{136}$, $Na_{18.72}Si_{136}$, $Na_{7.20}Si_{136}$, $Na_{11.4}Si_{136}$, $Na_{1.52}Si_{136}$, $Na_{23.36}Si_{136}$, $Na_{24.00}Si_{136}$, $Na_{20.48}Si_{136}$, $Na_{16.00}Si_{136}$, and $Na_{14.80}Si_{136}$ were produced as the silicon clathrate II.

JP2012-224488A (Patent Literature 1) also discloses a method for producing a silicon clathrate. Specifically, Patent Literature 1 indicates that an Na—Si alloy produced by using a silicon wafer and Na was heated at 400° C. for three hours under a reduced-pressure condition in which the pressure was not higher than $10^{-2}$ Pa, to remove Na, thereby producing the silicon clathrate I and the silicon clathrate II.

The silicon clathrate II in which Li, K, Rb, Cs, or Ba substitutes for Na contained in the silicon clathrate II, and the silicon clathrate II in which Ga or Ge partially substitutes for Si in the silicon clathrate II are also reported.

SUMMARY OF INVENTION

Technical Problem

The silicon clathrate II maintains the structure even in a case where the contained Na has separated. The inventor of the present invention has focused on this fact and conceived of utilizing the silicon clathrate II from which the contained Na has separated, as a negative electrode active material for a lithium ion secondary battery.

The present invention has been made in view of such circumstances, and an object of the present invention is to provide a negative electrode active material that contains silicon clathrate II and that is suitable for a negative electrode of a lithium ion secondary battery.

Solution to Problem

A negative electrode active material of the present invention includes a silicon material in which silicon clathrate II represented by composition formula $Na_xSi_{136}$ ($0 \leq x \leq 10$) is contained and a volume of a pore having a diameter of not greater than 100 nm is not less than 0.025 cm$^3$/g.

Expansion of the negative electrode active material of the present invention is inhibited during charging. Therefore, the negative electrode having the negative electrode active material of the present invention is inhibited from being degraded during charging and discharging.

DESCRIPTION OF EMBODIMENTS

Figure 1:
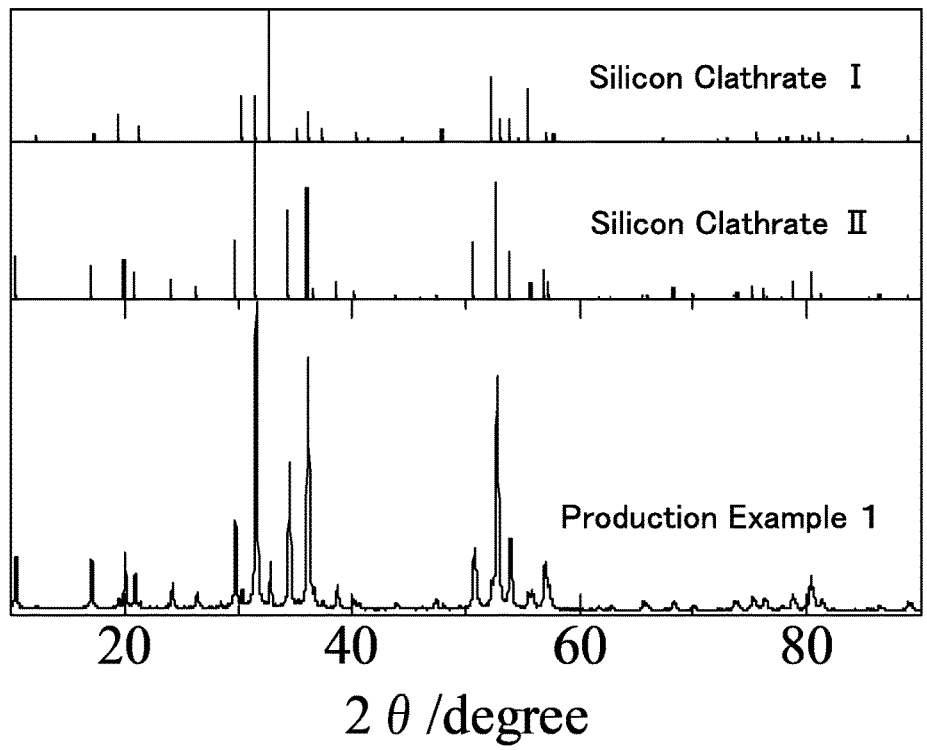
FIG. 1 illustrates an X-ray diffraction chart of a silicon material according to production example 1 and X-ray diffraction charts of silicon clathrate I and silicon clathrate II.

The following describes embodiments of the present invention. Unless mentioned otherwise in particular, a numerical value range of "x to y" described in the present specification includes, in the range thereof, a lower limit "x" and an upper limit "y". A numerical value range can be formed by arbitrarily combining such upper limit values, lower limit values, and numerical values described in Examples. In addition, numerical values arbitrarily selected within a numerical value range can be used as upper limit and lower limit numerical values.

A negative electrode active material of the present invention contains a silicon material (hereinafter, also referred to as the silicon material of the present invention) in which silicon clathrate II represented by composition formula $Na_xSi_{136}$ (0≤x≤10) is contained and a volume of a pore having a diameter of not greater than 100 nm is not less than 0.025 cm³/g.

In the silicon material of the present invention, a content of Na in the silicon clathrate II is preferably small, because lithium is movable into the polyhedral cage of the silicon clathrate II from which Na has separated, resulting in expansion of the negative electrode active material being inhibited.

The range of x in $Na_xSi_{136}$ is preferably 0≤x≤7, more preferably 0≤x≤5, even more preferably 0≤x≤3, particularly preferably 0≤x≤2, and most preferably 0≤x≤1.

The silicon material of the present invention is allowed to contain another element other than Na and Si within the gist of the present invention. Examples of the other element include Li, K, Rb, Cs, and Ba that substitute for Na in the silicon clathrate II and Ga and Ge that substitute for Si in the silicon clathrate II.

In the silicon material of the present invention, the volume of a pore having a diameter of not greater than 100 nm is not less than 0.025 cm³/g. The pore diameter size and the pore volume for the silicon material of the present invention represent the pore diameter size and the pore volume calculated when the silicon material of the present invention is analyzed by using the gas adsorption method specified in JIS Z 8831.

When a negative electrode of a lithium ion secondary battery is produced or the lithium ion secondary battery is assembled, pressure is applied to the negative electrode that includes the negative electrode active material. A pore having a large diameter has a low strength. Therefore, in a case where the negative electrode active material includes pores having large diameters, the pores having the large diameters are assumed to be deformed due to application of the pressure.

One of the reasons why the diameter of the pore is defined as being not greater than 100 nm in the silicon material of the present invention, is that the strength of a fine pore having a diameter of not greater than 100 nm is not substantially degraded, and deformation of the pore is assumed to be inhibited under a pressure applied condition during, for example, production of a lithium ion secondary battery. The other of the reasons why the diameter of the fine pore is defined as being not greater than 100 nm in the silicon material is that, according to the result of an experiment with a plurality of silicon materials including different volumes of such fine pores, a correlation has been found between the volume of such a fine pore and expansion (expansion force) of a negative electrode.

In the silicon material of the present invention, the volume of a pore having a diameter of not greater than 100 nm is, for example, in a range of 0.025 cm³/g to 0.1 cm³/g, in a range of 0.03 cm³/g to 0.08 cm³/g, in a range of 0.035 cm³/g to 0.07 cm³/g, or in a range of 0.04 cm³/g to 0.06 cm³/g.

In order to produce the silicon material of the present invention in which the volume of the pore having the diameter of not greater than 100 nm is not less than 0.025 cm³/g, reaction for separating Na from an Na—Si alloy is preferably performed at as low a temperature as possible.

The inventor of the present invention has examined a method for efficiently producing the silicon clathrate II by separating Na as vapor from an Na—Si alloy, and has considered that vapor of Na is trapped in a reaction system. By trapping vapor of Na in the reaction system, a partial pressure of Na is assumed to be reduced in the reaction system and a reaction rate is assumed to increase as desired, and, in addition, a great pressure reduction is assumed to be unnecessary as a reduced-pressure condition. Furthermore, an amount of Na discharged to the outside of the system is considered to be substantially reduced, and, thus, cost required for a special device for trapping Na is reduced.

The inventor of the present invention has found that, in an experiment in an environment in which an Na—Si alloy and a material (in the present specification, referred to as "Na getter agent") that reacts with Na coexist, a desired reaction progresses even in a condition in which pressure reduction is small, an amount of Na discharged to the outside of the system is reduced, and the silicon clathrate II is preferentially produced.

In the production method (hereinafter, simply referred to also as "the production method of the present invention") for producing the silicon clathrate II by using such an Na getter agent, a desired reaction progresses at a relatively low temperature, and, therefore, the production method of the present invention is advantageous for producing the silicon material of the present invention.

According to one mode of the production method of the present invention, in a reaction system in which an Na—Si alloy containing Na and Si and the Na getter agent coexist so as not to be in contact with each other, the Na—Si alloy is heated, whereby Na evaporated from the Na—Si alloy is caused to react with the Na getter agent to reduce an amount of Na in the Na—Si alloy.

The technical significance of the production method of the present invention is that gaseous Na (g) in the following reaction formula is captured by the Na getter agent in the system to cause the reaction to advantageously progress toward the right side of the following reaction formula. In the production method of the present invention, the reaction progresses under the condition that the Na partial pressure is relatively low. Therefore, advantageously, generation of the silicon clathrate I is inhibited and the silicon clathrate II is preferentially produced.

Na—Si alloy ⇌ silicon clathrate II+Na(g)

In the Na—Si alloy, the composition of Na and Si is represented by $Na_ySi_{136}$ (24<y). The Na—Si alloy is preferably an Na—Si alloy in which an amount of Na is excessively greater than an amount of Si, that is, an Na—Si alloy in which the composition of Na and Si is represented by $Na_zSi$ (1<z).

For producing the Na—Si alloy, Na and Si are melted in an inert gas atmosphere to form the alloy.

The Na—Si alloy is allowed to contain another element other than Na and Si within the gist of the present invention. Examples of the other element include Li, K, Rb, Cs, and Ba that substitute for Na in the silicon clathrate II, and Ga and Ge that substitute for Si in the silicon clathrate II.

The Na getter agent refers to a material that reacts with 0-valent Na. In view of the technical significance of the production method of the present invention, the Na getter agent refers to a material that reacts with 0-valent Na and has a vapor pressure lower than a vapor pressure of Na in metal form.

By using the Na getter agent having excellent reactivity with Na, the heating temperature is reduced in the production method of the present invention, and the gentle reduced-pressure condition is used.

Examples of the Na getter agent include metal oxides other than alkali metals and alkaline-earth metals, metal sulfides other than alkali metals and alkaline-earth metals, and metal halides other than alkali metals and alkaline-earth metals.

Specific examples of the Na getter agent include $WO_2$, $WO_3$, $MoO_3$, $ZnO$, $FeO$, $Fe_2O_3$, $VO$, $V_2O_3$, $TiO_2$, $SiO$, $SiO_2$, $Al_2O_3$, $WS_2$, $MoS_2$, $ZnS$, $FeS$, $TiS_2$, $SiS_2$, and $Al_2S_3$. Among them, the Na getter agent selected from $WO_3$, $MoO_3$, $ZnO$, $FeO$, $V_2O_3$, $TiO_2$, $SiO$, and $Al_2O_3$ is preferable, and the Na getter agent selected from $WO_3$, $MoO_3$, $FeO$, and $TiO_2$ is more preferable.

Reaction of the preferable Na getter agent with Na progresses even under a condition that the partial pressure of Na is low. Table 1 indicates the partial pressure of Na at a point of time when the reaction represented by the following reaction formula has reached equilibrium under the condition that a molar ratio between Na and the Na getter agent in the system is almost 1:1 and the temperature in the system is 350° C.

Na(g)+Na getter agent 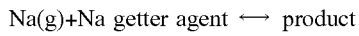 product

TABLE 1

| Na getter agent | Na partial pressure |
|---|---|
| $WO_3$ | $10^{-22.4}$ atm |
| $MoO_3$ | $10^{-26.3}$ atm |
| $ZnO$ | $10^{-6.5}$ atm |
| $FeO$ | $10^{-14.7}$ atm |
| $V_2O_3$ | $10^{-10.3}$ atm |
| $TiO_2$ | $10^{-15.9}$ atm |
| $SiO$ | $10^{-10.5}$ atm |
| $Al_2O_3$ | $10^{-5.5}$ atm |

An amount of the Na getter agent to be used is determined as appropriate according to an amount of Na contained in the Na—Si alloy. One kind of the Na getter agent is used or a plurality of kinds of the Na getter agents are used in combination.

In the production method of the present invention, use of the Na getter agent allows a desired reaction to progress even under the condition in which the pressure reduction is gentler, and allows a desired reaction to progress even at a lower heating temperature, as compared with a conventional method for producing the silicon clathrate II.

Under the reduced-pressure condition, an atmospheric pressure P satisfies, for example, $P<10^5$ Pa, $P \leq 10^4$ Pa, $P \leq 10^2$ Pa, $P \leq 10^2$ Pa, or $P \leq 10$ Pa. For example, the atmospheric pressure P advantageously satisfies $10^{-2}$ Pa$<P<10^5$ Pa, $10^{-1}$ Pa$\leq P \leq 10^4$ Pa, or 10 Pa$<P \leq 10^2$ Pa as compared with a conventional method for producing the silicon clathrate II.

A heating temperature t depends on the reduced-pressure condition. However, the heating temperature t satisfies, for example, 100° C.$\leq t \leq$450° C., 150° C.$\leq t \leq$400° C., 200° C.$\leq t \leq$350° C., or 250° C.$\leq t \leq$300° C. In a case where the heating temperature t is low, the atmospheric pressure P needs to be reduced.

The heating temperature t is preferably not higher than 400° C. In a case where the heating temperature t is not higher than 400° C., generation of an Si crystal having a diamond structure is inhibited, and a silicon material having favorable physical properties is obtained.

In the production method of the present invention, a step of causing Na to react with the Na getter agent to reduce an amount of Na in the Na—Si alloy is performed as a single step to produce the silicon clathrate II, or the silicon clathrate II obtained in the above-described step and a new Na getter agent are caused to coexist without coming into contact with each other and the silicon clathrate II is heated to produce the silicon clathrate II having a reduced amount of Na.

As another mode of the production method of the present invention, the following production method is provided according to the above description.

Another mode of the production method of the present invention is a production method for producing the silicon clathrate II represented by composition formula $Na_{x2}Si_{136}$. In the production method, in a reaction system in which the silicon clathrate II represented by composition formula $Na_{x1}Si_{136}$ and the Na getter agent coexist so as not to be in contact with each other, the silicon clathrate II is heated, and Na evaporated from the silicon clathrate II is caused to react with the Na getter agent to reduce an amount of Na in the silicon clathrate II. $x_1$ and $x_2$ satisfy $0<x1 \leq 24$, $0 \leq x2 \leq 10$, and $x2 \leq x1$.

Na, NaOH, or the like is likely to attach to the silicon material containing the silicon clathrate II produced in the production method of the present invention. Therefore, a step of cleaning the silicon material with water in order to remove Na, NaOH, or the like is preferably performed.

By cleaning the silicon material with water, the surface of the silicon material is partially oxidized and oxygen is expected to be introduced into the silicon material. The silicon material into which oxygen has been introduced is expected to enhance stability and enhance performance as a negative electrode active material.

As water to be used in the cleaning step, an acidic aqueous solution is preferably used from the viewpoint that Na, NaOH, or the like is easily dissolved. The concentration of the acid in the acidic aqueous solution is preferably 0.1 to 10 mass %, more preferably 0.5 to 5 mass %, and even more preferably 1 to 4 mass %.

After the cleaning step, water is preferably removed from the silicon material by filtering and drying.

The silicon material is preferably pulverized and classified to form powder having a uniform particle size distribution.

The mean particle diameter of the silicon material is preferably in a range of 1 to 30 μm, more preferably in a range of 2 to 20 μm, and even more preferably in a range of 3 to 15 μm. The mean particle diameter refers to a value of $D_{50}$ obtained when a sample is measured by a typical laser diffraction type particle-size-distribution measuring device.

The lithium ion secondary battery includes a positive electrode, a negative electrode, an electrolytic solution, and a separator, or includes a positive electrode, a negative electrode, and a solid electrolyte. The negative electrode active material of the present invention which contains the silicon material of the present invention, is provided in the negative electrode. The silicon material of the present invention is allowed to have the surface covered with a conductive material such as carbon, and such a silicon material is allowed to be adopted as the negative electrode active material of the present invention.

In the lithium ion secondary battery, known components are adopted as appropriate as components other than the negative electrode active material of the present invention.

Expansion of the negative electrode that includes the negative electrode active material of the present invention is inhibited during charging. Therefore, in the lithium ion secondary battery that includes the negative electrode active material of the present invention, the confining pressure of the cell structure of positive electrode-separator-negative electrode or the cell structure of positive electrode-solid electrolyte-negative electrode in the thickness direction is reduced. Furthermore, the lithium ion secondary battery that includes the negative electrode active material of the present invention is expected to have an elongated lifespan.

In general, a confining pressure is high in a solid-type lithium ion secondary battery that uses a solid electrolyte. Therefore, the effect of reducing the confining pressure of the lithium ion secondary battery having the negative electrode active material of the present invention is effectively exerted in the solid-type lithium ion secondary battery.

Although the embodiments of the present invention have been described above, the present invention is not limited to the embodiments. Without departing from the gist of the present invention, the present invention can be implemented in various modes with modifications and improvements, etc., that can be made by a person skilled in the art.

EXAMPLES

The present invention will be more specifically described below by presenting production examples, examples, comparative examples, and the like. The present invention is not limited to these examples.

Production Example 1

Producing Na—Si Alloy

Na and Si were melted under an inert gas atmosphere and cooled to produce an Na—Si alloy. In the Na—Si alloy, a composition ratio of Na to Si was slightly high.

Producing Silicon Clathrate II 1 part by mass of SiO powder was placed as the Na getter agent on the inside bottom of a reaction vessel made of stainless steel. A crucible made of stainless steel was disposed on the upper portion of a base provided on the inside bottom of the reaction vessel made of the stainless steel. 1 part by mass of the Na—Si alloy was placed in the crucible.

The reaction vessel made of the stainless steel was lidded by a lid made of stainless steel and the reaction vessel with the lid was disposed in a vacuum furnace. Gas in the reaction vessel was allowed to be discharged through a gap between the reaction vessel made of the stainless steel and the lid made of the stainless steel.

The pressure in the vacuum furnace was reduced to 10 Pa, and the inside of the vacuum furnace was heated at 350° C. for 12 hours to synthesize a silicon material containing the silicon clathrate II.

The inside of the vacuum furnace was cooled to room temperature, and the silicon material containing the silicon clathrate II was collected from the crucible. A reaction product obtained by reaction between the Na getter agent and Na on the inside bottom of the reaction vessel was also collected. Deposition of Na in metal form was not observed inside the vacuum furnace and the reaction vessel.

The silicon material was put into 3 mass % of hydrochloric acid and stirred to be cleaned. The cleaned silicon material was separated by filtering, and dried at 80° C. under a reduced pressure to produce the silicon material containing the silicon clathrate II according to production example 1.

Evaluation Example 1

X-ray diffraction measurement of the silicon material containing the silicon clathrate II according to production example 1 and the reaction product obtained by reaction between the Na getter agent and Na was performed by using a powder X-ray diffractometer.

Figure 2:
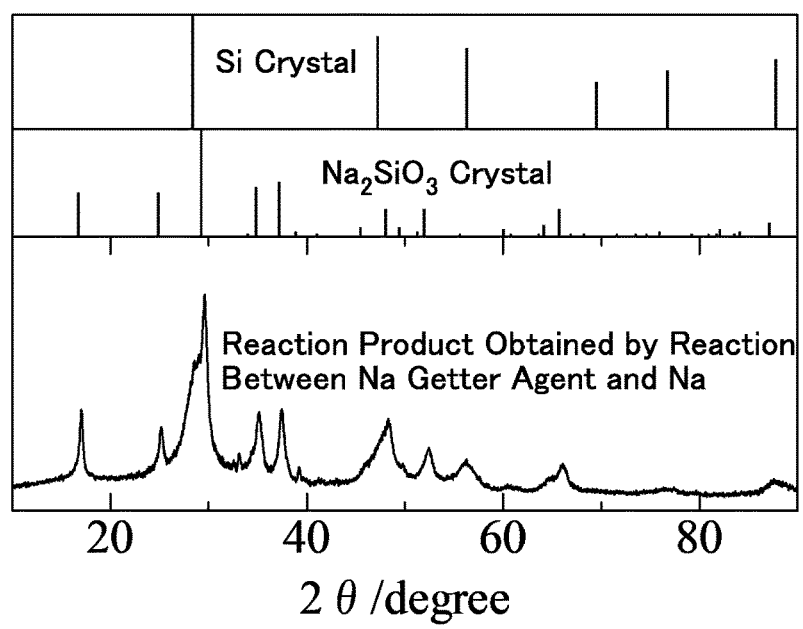
FIG. 2 illustrates an X-ray diffraction chart of a reaction product obtained by reaction between an Na getter agent and Na according to evaluation example 1, and X-ray diffraction charts of an $Na_2SiO_3$ crystal and an Si crystal having a diamond structure.

FIG. 1 illustrates an X-ray diffraction chart of the silicon material according to production example 1 and X-ray diffraction charts of the silicon clathrate I and the silicon clathrate II. FIG. 2 illustrates an X-ray diffraction chart of the reaction product obtained by reaction between the Na getter agent and Na and X-ray diffraction charts of an $Na_2SiO_3$ crystal and an Si crystal having a diamond structure.

FIG. 1 indicates that the main component of the silicon material according to production example 1 was the silicon clathrate II. FIG. 2 also indicates that SiO as the Na getter agent reacted with Na to produce $Na_2SiO_3$.

Production Example 2

A silicon material containing the silicon clathrate II according to production example 2 was produced in the same method as in production example 1 except that synthesizing the silicon material in producing the silicon clathrate II was performed in two steps as described below.

Synthesizing Silicon Material Containing Silicon Clathrate II (First Step)

1 part by mass of SiO powder was placed as the Na getter agent on the inside bottom of a reaction vessel made of stainless steel. A crucible made of stainless steel was disposed on the upper portion of a base provided on the inside bottom of the reaction vessel made of the stainless steel. 1 part by mass of the Na—Si alloy was placed in the crucible. The reaction vessel made of the stainless steel was lidded by a lid made of stainless steel and the reaction vessel with the lid was disposed in a vacuum furnace. The pressure in the vacuum furnace was reduced to 10 Pa, and the inside of the vacuum furnace was heated at 350° C. for 12 hours to synthesize a silicon material containing the silicon clathrate II.

The inside of the vacuum furnace was cooled to room temperature, and the silicon material containing the silicon clathrate II was collected from the crucible.

Synthesizing Silicon Material Containing Silicon Clathrate II (Second Step)

1 part by mass of SiO powder was placed as the Na getter agent on the inside bottom of another reaction vessel made of stainless steel. A crucible made of stainless steel was disposed on the upper portion of a base provided on the inside bottom of the reaction vessel made of the stainless steel. 1 part by mass of the collected silicon material was placed in the crucible. The reaction vessel made of the stainless steel was lidded by a lid made of stainless steel and the reaction vessel with the lid was disposed in a vacuum furnace. The pressure in the vacuum furnace was reduced to 10 Pa, and the inside of the vacuum furnace was heated at 350° C. for 6 hours to synthesize a silicon material containing the silicon clathrate II.

Production Example 3

A silicon material containing the silicon clathrate II according to production example 3 was produced in the same method as in production example 2 except that synthesizing the silicon material in the second step in producing the silicon clathrate II was performed at the temperature of 400° C.

Production Example 4

A silicon material containing the silicon clathrate II according to production example 4 was produced in the same method as in production example 2 except that synthesizing the silicon material in the second step in producing the silicon clathrate II was performed at the temperature of 400° C. for the heating time of 12 hours.

Production Example 5

A silicon material containing the silicon clathrate II according to production example 5 was produced in the same method as in production example 2 except that synthesizing the silicon material in the second step in producing the silicon clathrate II was performed at the temperature of 450° C.

Evaluation Example 2

X-ray diffraction measurement of the silicon material containing the silicon clathrate II according to each of production example 1 to production example 5 was performed by using a powder X-ray diffractometer. The silicon clathrate II in the silicon material according to production example 1 substantially corresponds to the silicon clathrate II synthesized in the first step in producing the silicon material according to production example 2 to production example 5.

Figure 3:
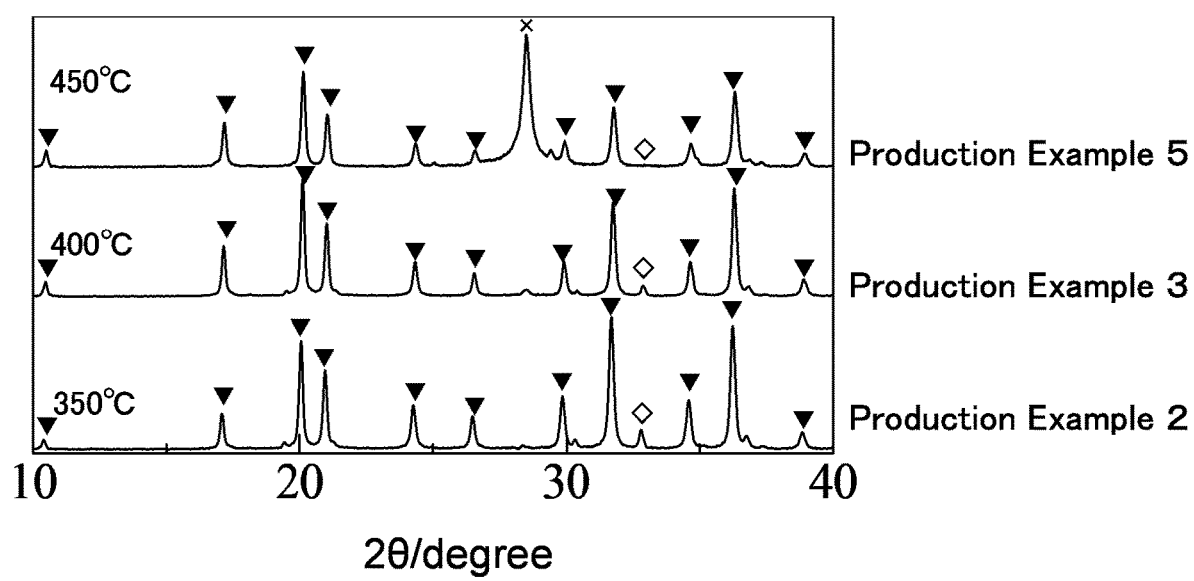
FIG. 3 illustrates an X-ray diffraction chart of a silicon material according to each of production example 2, production example 3, and production example 5.

FIG. 3 illustrates an X-ray diffraction chart of the silicon material according to each of production example 2, production example 3, and production example 5. In FIG. 3, peaks indicated by triangles are derived from the silicon clathrate II, peaks indicated by quadrangles are derived from the silicon clathrate I, and a peak indicated by x is derived from an Si crystal having a diamond structure.

FIG. 3 indicates that the main component of the silicon material according to each of production example 2, production example 3, and production example 5 was the silicon clathrate II. FIG. 3 also indicates that the silicon material of production example 5 in which the heating temperature was 450° C., contained an Si crystal having a diamond structure.

The above-described results indicate that the partial pressure of Na was relatively high under the condition that synthesizing the silicon material of production example 5 was performed at the heating temperature of 450° C., and a proportion of the silicon clathrate I generated as an intermediate is considered to have been relatively high. The silicon clathrate I is considered to have been turned to an Si crystal according to Na being removed from the silicon clathrate I as the intermediate.

Meanwhile, the partial pressure of Na was relatively low under the condition that synthesizing the silicon material according to each of production example 2 and production example 3 was performed at the heating temperature of not higher than 400° C., and a proportion of the silicon clathrate I generated as an intermediate was thus relatively low, and the silicon clathrate II is considered to have been preferentially produced.

In the X-ray diffraction chart of the silicon material according to each of production example 1 to production example 5, a value of x in composition formula $Na_xSi_{136}$ for the silicon clathrate II in each production example was calculated based on an intensity of a peak derived from (311) of the silicon clathrate II and an intensity of a peak derived from (511) of the silicon clathrate II. The value of x in composition formula $Na_xSi_{136}$ for the silicon clathrate II has a correlation with the value of a ratio of the intensity of the peak derived from (511) to the intensity of the peak derived from (311).

Table 2 indicates the results.

TABLE 2

| | Synthesizing condition | Value of x |
|---|---|---|
| Production example 1 | One step | 22.4 |
| Production example 2 | Second step: conditions were 350° C. and 6 hours | 6.8 |
| Production example 3 | Second step: conditions were 400° C. and 6 hours | 1.7 |
| Production example 4 | Second step: conditions were 400° C. and 12 hours | 1.5 |
| Production example 5 | Second step: conditions were 450° C. and 6 hours | 0.6 |

Table 2 indicates that the higher the heating temperature is and the longer the heating time is, the less the value of x in composition formula $Na_xSi_{136}$ for the produced silicon clathrate II is.

Production Example 6

A silicon material containing the silicon clathrate II according to production example 6 was produced in the same method as in production example 1 except that synthesizing a silicon material in producing the silicon clathrate II was performed as described below.

$MoO_3$ powder was placed as the Na getter agent on the inside bottom of a reaction vessel made of stainless steel. A crucible made of stainless steel was disposed on the upper portion of a base provided on the inside bottom of the reaction vessel made of the stainless steel. The Na—Si alloy was placed in the crucible. A molar ratio between Na in the Na—Si alloy and the Na getter agent was 4:6.

The reaction vessel made of the stainless steel was lidded by a lid made of stainless steel and the reaction vessel with the lid was disposed in a vacuum furnace.

The pressure in the vacuum furnace was reduced to 10 Pa, and the inside of the vacuum furnace was heated at 280° C. for 40 hours to synthesize a silicon material containing the silicon clathrate II.

Production Example 7

A silicon material containing the silicon clathrate II according to production example 7 was produced in the same method as in production example 6 except that the heating temperature was 330° C. and the heating time was 20 hours.

Production Example 8

A silicon material containing the silicon clathrate II according to production example 8 was produced in the same method as in production example 6 except that FeO powder was used as the Na getter agent.

Production Example 9

A silicon material containing the silicon clathrate II according to production example 9 was produced in the same method as in production example 8 except that the heating temperature was 330° C. and the heating time was 20 hours.

Production Example 10

A silicon material containing the silicon clathrate II according to production example 10 was produced in the same method as in production example 8 except that the heating temperature was 380° C. and the heating time was 20 hours.

Production Example 11

A silicon material containing the silicon clathrate II according to production example 11 was produced in the same method as in production example 8 except that the heating temperature was 430° C. and the heating time was 6 hours.

Production Example 12

A silicon material containing the silicon clathrate II according to production example 12 was produced in the same method as in production example 6 except that SiO powder was used as the Na getter agent.

Production Example 13

A silicon material containing the silicon clathrate II according to production example 13 was produced in the same method as in production example 12 except that synthesizing the silicon material in producing the silicon clathrate II was performed in two steps as described below.

Synthesizing Silicon Material Containing Silicon Clathrate II (First Step)

SiO powder was placed as the Na getter agent on the inside bottom of a reaction vessel made of stainless steel. A crucible made of stainless steel was disposed on the upper portion of a base provided on the inside bottom of the reaction vessel made of the stainless steel. The Na—Si alloy was placed in the crucible. A molar ratio between Na in the Na—Si alloy and the Na getter agent was 4:6.

The reaction vessel made of the stainless steel was lidded by a lid made of stainless steel and the reaction vessel with the lid was disposed in a vacuum furnace. The pressure in the vacuum furnace was reduced to 10 Pa, and the inside of the vacuum furnace was heated at 280° C. for 40 hours to synthesize a silicon material containing the silicon clathrate II.

The inside of the vacuum furnace was cooled to room temperature, and the silicon material containing the silicon clathrate II was collected from the crucible.

Synthesizing Silicon Material Containing Silicon Clathrate II (Second Step)

SiO powder was placed as the Na getter agent on the inside bottom of another reaction vessel made of stainless steel. A crucible made of stainless steel was disposed on the upper portion of a base provided on the inside bottom of the reaction vessel made of the stainless steel. The collected silicon material was placed in the crucible. A molar ratio between Na in the collected silicon material and the Na getter agent was 4:6.

The reaction vessel made of the stainless steel was lidded by a lid made of stainless steel and the reaction vessel with the lid was disposed in a vacuum furnace. The pressure in the vacuum furnace was reduced to 10 Pa, and the inside of the vacuum furnace was heated at 330° C. for 20 hours to synthesize a silicon material containing the silicon clathrate II.

Production Example 14

A silicon material containing the silicon clathrate II according to production example 14 was produced in the same method as in production example 13 except that synthesizing the silicon material in the second step in producing the silicon clathrate II was performed at the temperature of 380° C.

Production Example 15

A silicon material containing the silicon clathrate II according to production example 15 was produced in the same method as in production example 13 except that synthesizing the silicon material in the second step in producing the silicon clathrate II was performed at the temperature of 480° C. for the heating time of 6 hours.

Comparative Production Example 1

A silicon material of comparative production example 1 was produced in the same method as in production example 1 except that synthesizing the silicon material in producing the silicon clathrate II was performed as described below.

An Na—Si alloy was placed on the inside bottom of a reaction vessel made of stainless steel. The reaction vessel was disposed in a vacuum furnace. The pressure in the vacuum furnace was reduced to 10 Pa, and the inside of the vacuum furnace was heated at 280° C. for 40 hours to synthesize the silicon material. The inside of the vacuum furnace was cooled to room temperature and the silicon material was collected.

Comparative Production Example 2

A silicon material of comparative production example 2 was produced in the same method as in comparative production example 1 except that synthesizing the silicon material was performed in two steps as described below.

Synthesizing Silicon Material (First Step)

An Na—Si alloy was placed on the inside bottom of a reaction vessel made of stainless steel. The reaction vessel was disposed in a vacuum furnace. The pressure in the vacuum furnace was reduced to 10 Pa, and the inside of the vacuum furnace was heated at 280° C. for 40 hours to synthesize a silicon material. The inside of the vacuum furnace was cooled to room temperature and the silicon material was collected.

Synthesizing Silicon Material (Second Step)

The collected silicon material was placed on the inside bottom of another reaction vessel made of stainless steel. The reaction vessel was disposed in a vacuum furnace. The pressure in the vacuum furnace was reduced to 10 Pa, and the inside of the vacuum furnace was heated at 380° C. for 20 hours to synthesize the silicon material containing the silicon clathrate II.

Comparative Production Example 3

A silicon material of comparative production example 3 was produced in the same method as in comparative production example 2 except that synthesizing the silicon material in the second step was performed at the temperature of 480° C. for the heating time of 6 hours.

Evaluation Example 3

X-ray diffraction measurement of the silicon material containing the silicon clathrate II according to each of production example 6 to production example 15, and the silicon material according to each of comparative production example 1 to comparative production example 3 was performed by using a powder X-ray diffractometer.

The results indicate that the silicon material of each of production example 6 to production example 15 and the silicon material of each of comparative production example 2 to comparative production example 3 contained the silicon clathrate II. However, a peak derived from the silicon clathrate II was not detected from the silicon material of comparative production example 1. The results indicate that the silicon clathrate II was not produced under the production condition in comparative production example 1.

Furthermore, in the X-ray diffraction charts of the silicon material in each of production example 6 to production example 15 and the silicon material in each of comparative production example 2 to comparative production example 3, a value of x in composition formula $Na_xSi_{136}$ for the silicon clathrate II in each production example was calculated based on an intensity of a peak derived from (311) of the silicon clathrate II and an intensity of a peak derived from (511) of the silicon clathrate II.

Table 3 indicates the results thereof.

TABLE 3

| | Na getter agent | Synthesizing condition | Value of x |
|---|---|---|---|
| Production example 6 | $MoO_3$ | 280° C. 40 hours | 4.9 |
| Production example 7 | $MoO_3$ | 330° C. 20 hours | 3.5 |
| Production example 8 | FeO | 280° C. 40 hours | 8.4 |
| Production example 9 | FeO | 330° C. 20 hours | 5.8 |
| Production example 10 | FeO | 380° C. 20 hours | 1.8 |
| Production example 11 | FeO | 430° C. 6 hours | 0.6 |
| Production example 12 | SiO | 280° C. 40 hours | 21.7 |
| Production example 13 | SiO | 280° C. 40 hours + 330° C. 20 hours | 9.4 |
| Production example 14 | SiO | 280° C. 40 hours + 380° C. 20 hours | 4.8 |
| Production example 15 | SiO | 280° C. 40 hours + 480° C. 6 hours | 2.4 |
| Comparative production example 1 | — | 280° C. 40 hours | Not measured due to no reaction |
| Comparative production example 2 | — | 280° C. 40 hours + 380° C. 20 hours | 16.7 |
| Comparative production example 3 | — | 280° C. 40 hours + 480° C. 6 hours | 1.1 |

Table 3 indicates that removal of Na from the Na—Si alloy smoothly progressed under the synthesizing condition in which the Na getter agent was used. Table 3 also indicates that the reaction rate varied depending on the kind of the Na getter agent.

Use of the Na getter agent allowed the reaction to progress at a lower temperature for a shorter time period.

Evaluation Example 4

The silicon material according to each of production example 6, production example 10, production example 11, and comparative production example 3 was analyzed by using the gas adsorption method specified in JIS Z 8831. Table 4 indicates the results. The pore volume in Table 4 refers to a volume of a pore having a diameter of not greater than 100 nm.

TABLE 4

| | Synthesizing condition | Value of x | Pore volume |
|---|---|---|---|
| Production example 6 | Na getter agent was used, 280° C. 40 hours | 4.9 | 0.052 cm³/g |
| Production example 10 | Na getter agent was used, 380° C. 20 hours | 1.8 | 0.031 cm³/g |
| Production example 11 | Na getter agent was used, 430° C. 6 hours | 0.6 | 0.026 cm³/g |
| Comparative production example 3 | Na getter agent was not used, 280° C. 40 hours + 480° C. 6 hours | 1.1 | 0.019 cm³/g |

Table 4 indicates that the lower the heating temperature in the synthesizing condition was, the greater the volume of a pore having a diameter of not greater than 100 nm was. In the method for producing the silicon material of the present invention, the heating temperature is preferably low.

Example 1

A solid-type lithium ion secondary battery according to example 1 was produced as described below by using the silicon material of production example 10.

0.4 g of 0.75 $Li_2S$-0.25 $P_2S_5$ particles as a solid electrolyte material, 0.8 g of the silicon material of production example 10 as a negative electrode active material in which the mean particle diameter was 1 μm, 0.06 g of vapor grown carbon fiber as a conductive material, and 0.32 g of 5 mass % of butyl butyrate solution of a PVDF-based resin as a binding agent were added into a container made of polypropylene. The container was sonicated for 30 seconds in an ultrasonic dispersing device, and shook for 30 minutes by using a shaker, to prepare a negative electrode mixture material A containing a relatively large content of the negative electrode active material.

0.7 g of 0.75 $Li_2S$-0.25 $P_2S_5$ particles as a solid electrolyte material, 0.6 g of particles of Si elemental substance as a material for a negative electrode active material in which the mean particle diameter was 3 μm, 0.06 g of vapor grown carbon fiber as a conductive material, and a 0.24 g of 5 mass % of butyl butyrate solution of a PVDF-based resin as a binding agent were added into a container made of polypropylene. The container was sonicated for 30 seconds in an ultrasonic dispersing device, and shook for 30 minutes by using a shaker, to prepare a negative electrode mixture material B containing a relatively small content of the negative electrode active material.

The prepared negative electrode mixture material A having a large content of the negative electrode active material was applied onto a copper foil serving as a current collector in a blade method using an applicator, and dried in a natural condition for 60 minutes.

Subsequently, the negative electrode mixture material B having a small content of the negative electrode active material was applied onto the surface of the negative electrode mixture material A having been dried in the natural condition in a blade method using an applicator, and dried in a natural condition for 60 minutes to obtain a precursor of a negative electrode.

The precursor of the negative electrode having been thus obtained was dried on a hot plate adjusted to 100° C. for 30 minutes to produce a negative electrode.

0.3 g of 0.75 $Li_2S$-0.25 $P_2S_5$ particles as a solid electrolyte material, 2 g of $LiNi_{1/3}Co_{1/3}Mn_{1/3}O_2$ particles as a material for a positive electrode active material, 0.03 g of vapor grown carbon fiber as a conductive material, and 0.3 g of 5 mass % of butyl butyrate solution of a PVDF-based resin as a binding agent were added into a container made of polypropylene. The container was sonicated for 30 seconds in an ultrasonic dispersing device, and shook for 30 minutes by using a shaker, to prepare a positive electrode mixture material.

The positive electrode mixture material having been thus prepared was applied onto an aluminum foil serving as a current collector in a blade method using an applicator, and dried in a natural condition for 60 minutes to obtain a precursor of a positive electrode.

The precursor of the positive electrode having been thus obtained was dried on a hot plate adjusted to 100° C. for 30 minutes to produce a positive electrode.

0.4 g of 0.75 $Li_2S$-0.25 $P_2S_5$ as a solid electrolyte material in which the mean particle diameter was 2 μm, and 0.05 g of 5 mass % of heptane solution of an ABR-based resin as a binding agent were added into a container made of polypropylene. The container was sonicated for 30 seconds in an ultrasonic dispersing device, and shook for 30 minutes by using a shaker, to prepare a solid electrolyte material paste.

The solid electrolyte material paste having been thus prepared was applied onto an Al foil serving as a substrate in a blade method using an applicator, and dried on a hot plate adjusted to 100° C. for 30 minutes to obtain a solid electrolyte layer.

The above-described negative electrode, solid electrolyte layer, and positive electrode were stacked in order, respectively, so as to be in contact with each other. 200 MPa of pressure was applied to a stacked body of the negative electrode-solid electrolyte layer-positive electrode at 130° C. for 3 minutes to obtain the solid-type lithium ion secondary battery of example 1.

Comparative Example 1

A solid-type lithium ion secondary battery of comparative example 1 was produced in the same method as in example 1 except that the silicon material of comparative production example 3 was used for the negative electrode active material.

Reference Example 1

A solid-type lithium ion secondary battery of reference example 1 was produced in the same method as in example 1 except that powder of Si crystal having a diamond structure was used for the negative electrode active material.

Evaluation Example 5

The solid-type lithium ion secondary battery of example 1 was held with a predetermined pressure, and was energized with a constant current at 0.1 C up to a predetermined voltage to perform initial charging.

In the initial charging, the confining pressure of the battery was monitored, and a confining pressure in a charged state was measured.

The same test was conducted for the solid-type lithium ion secondary battery of each of comparative example 1 and reference example 1.

A proportion of the highest confining pressure measured in the solid-type lithium ion secondary battery of each of example 1 and comparative example 1 relative to the highest confining pressure measured in the solid-type lithium ion secondary battery of reference example 1 was calculated.

Table 5 indicates the results.

TABLE 5

|  | Value of x and pore volume in silicon material | Proportion of confining pressure |
|---|---|---|
| Example 1 | 1.8, 0.031 cm$^3$/g | 75% |
| Comparative example 1 | 1.1, 0.019 cm$^3$/g | 85% |

Table 5 indicates that the confining pressure in the solid-type lithium ion secondary battery of each of example 1 and comparative example 1 in which the silicon material containing the silicon clathrate II was used as the negative electrode active material, was lower than the confining pressure in the solid-type lithium ion secondary battery of reference example 1 in which Si crystal powder was used as the negative electrode active material. Table 5 also indicates that reduction of the confining pressure was great in a case where a pore having a diameter of not greater than 100 nm had a large volume in the silicon material containing the silicon clathrate II.

The above-described results indicate that use of the silicon material of the present invention as a negative electrode active material effectively inhibits expansion of the negative electrode during charging.

The invention claimed is:

1. A negative electrode active material comprising a silicon material in which silicon clathrate II represented by composition formula $Na_xSi_{136}$ (0≤x≤10) is contained and a volume of a pore having a diameter of not greater than 100 nm is not less than 0.025 cm$^3$/g.

2. A negative electrode comprising the negative electrode active material according to claim 1.

3. A lithium ion secondary battery comprising the negative electrode according to claim 2.

* * * * *